(12) United States Patent
Mizutani et al.

(10) Patent No.: US 11,024,996 B2
(45) Date of Patent: Jun. 1, 2021

(54) METALLIC MATERIAL AND CONNECTION TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Ryota Mizutani, Yokkaichi (JP); Yoshifumi Saka, Yokkaichi (JP); Akihiro Kato, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/695,451

(22) Filed: Nov. 26, 2019

(65) Prior Publication Data

US 2020/0235510 A1 Jul. 23, 2020

(30) Foreign Application Priority Data

Jan. 18, 2019 (JP) .............................. JP2019-007134

(51) Int. Cl.
*H01R 13/03* (2006.01)

(52) U.S. Cl.
CPC .................................... *H01R 13/03* (2013.01)

(58) Field of Classification Search
CPC .......... H01R 13/02; H01R 13/03; H01R 4/58; H01H 1/02; C25D 5/50
USPC ........................................................ 439/886
See application file for complete search history.

(56) References Cited

U.S. PATENT DOCUMENTS

| | | | | |
|---|---|---|---|---|
| 4,050,930 A | * | 9/1977 | Motoyoshi | ................ C22C 5/06 148/431 |
| 4,072,515 A | * | 2/1978 | Motoyoshi | ......... H01H 1/02372 148/431 |
| 4,342,498 A | * | 8/1982 | Patton | .................. H01R 13/187 439/839 |
| 6,755,958 B2 | * | 6/2004 | Datta | .................... C23C 28/021 205/176 |
| 7,294,028 B2 | * | 11/2007 | Rehbein | ................... H01H 1/02 428/614 |
| 7,651,785 B2 | * | 1/2010 | Takei | .................... C23C 28/324 428/647 |

(Continued)

FOREIGN PATENT DOCUMENTS

JP 2013-231228 11/2013

*Primary Examiner* — Alexander Gilman
(74) *Attorney, Agent, or Firm* — Oliff PLC

(57) ABSTRACT

A metallic material that includes a foundation material; and a surface layer formed on a surface of the foundation material and exposed on an outermost surface, wherein the surface layer contains a precious metal element made of at least one kind selected from the group consisting of Ag, Au, and a platinum group element, and In, and a connection terminal being made of the metallic material, wherein the surface layer is formed on a surface of the foundation material, at least in a contact portion electrically contacting an opposite electrically conductive member.

6 Claims, 3 Drawing Sheets

(56) References Cited

U.S. PATENT DOCUMENTS

| | | | | |
|---|---|---|---|---|
| 8,016,624 B2* | 9/2011 | Oda | C25D 5/50 | |
| | | | 439/886 | |
| 8,342,895 B2* | 1/2013 | Yoshida | C25D 5/10 | |
| | | | 439/886 | |
| 8,637,164 B2* | 1/2014 | Kobayashi | C25D 7/00 | |
| | | | 428/673 | |
| 8,728,629 B2* | 5/2014 | Kitagawa | B23K 26/354 | |
| | | | 428/647 | |
| 9,114,594 B2* | 8/2015 | Zhang-Beglinger | C22C 5/06 | |
| 9,401,556 B2* | 7/2016 | Tsugawa | H01R 13/26 | |
| 9,576,693 B2* | 2/2017 | Shibuya | B32B 15/01 | |
| 9,680,246 B2* | 6/2017 | Takahashi | H01R 13/03 | |
| 9,692,162 B2* | 6/2017 | Sunaga | C25D 7/00 | |
| 9,979,110 B2* | 5/2018 | Shibuya | C25D 5/505 | |
| RE47,600 E* | 9/2019 | Pendse | H01L 24/32 | |
| 10,594,062 B2* | 3/2020 | Shirai | H01R 12/585 | |
| 2003/0091855 A1* | 5/2003 | Tanaka | C23C 28/023 | |
| | | | 428/647 | |
| 2003/0186597 A1* | 10/2003 | Suzuki | H01R 13/03 | |
| | | | 439/886 | |
| 2010/0186993 A1* | 7/2010 | Yamaguchi | B32B 15/018 | |
| | | | 174/126.2 | |
| 2014/0227551 A1* | 8/2014 | Rateiczak | B32B 17/10174 | |
| | | | 428/615 | |
| 2015/0079422 A1* | 3/2015 | Sunaga | C22C 5/06 | |
| | | | 428/673 | |

* cited by examiner

METALLIC MATERIAL AND CONNECTION TERMINAL

BACKGROUND

The present disclosure relates to a metallic material and a connection terminal. More particularly, the present disclosure relates to a metallic material having a surface layer containing a precious metal element and In, and a connection terminal having such a surface layer in a contact portion.

In an electric connection member such as a connection terminal, a precious metal layer made of Ag, Au, a platinum group element, or the like may be provided on a surface. These precious metals have high electric conductivity, and are less subject to oxidizing. Thus, an electric connection member having low contact resistance and a stable electric connection characteristic can be formed by configuring an electric connection member such as a connection terminal using a metallic material having a precious metal layer on a surface. A low contact resistance characteristic is maintained even at high temperature, and a metallic material having precious metal layer on a surface can be suitably used in an automobile or the like, as a constituent material of a connection member for which use in a high-temperature environment or the application of high current is assumed.

In an electric connection member such as a connection terminal, it is desired that a surface not only has a stable electric connection characteristic, but also exhibits a satisfactory friction characteristic, i.e., a low friction coefficient. By lowering the friction coefficient of the surface, sliding can be smoothly performed when another member such as an opposite connection terminal is brought into contact with the surface of the electric connection member. For example, when a connection terminal is configured, force required for insertion and removal of the connection terminal can be kept down.

For example, as shown in Japanese Unexamined Patent Application Publication No. 2013-231228, reduction of the friction coefficient of an Ag layer surface is attempted by providing a hard metallic layer on the lower surface of the Ag layer. In Japanese Unexamined Patent Application Publication No. 2013-231228, an Ag—Sn alloy layer is used as a hard metallic layer.

SUMMARY

As described in Japanese Unexamined Patent Application Publication No. 2013-231228, by providing, on the lower layer of a precious metal layer, a metallic layer containing another kind of metallic element in a metallic material, it is possible to maintain a characteristic of the precious metal layer such as a low contact resistance characteristic, and yet improve surface characteristics of the precious metal layer such as reduction of a friction coefficient by the metallic layer on the lower layer. However, even when the metallic layer on the lower layer exhibits a certain degree of an effect in the improvement of the surface characteristic of the precious metal layer on an upper layer, the surface of the metallic layer on the lower layer is covered with the precious metal layer, and does not contact an opposite metallic material. Thus, the metallic layer on the lower layer does not directly affect the characteristics of the surface of the metallic material, such as an electric characteristic or a frictional characteristic. That is, the metallic material described above is insufficient for improvement of surface characteristics, such as reduction in a friction coefficient and contact resistance.

An exemplary aspect of the disclosure provides a metallic material and a connection terminal having a surface layer containing a precious metal element, and being capable of achieving both low contact resistance and a low friction coefficient.

A metallic material according to the present disclosure includes a foundation material, and a surface layer formed on a surface of the foundation material and exposed on an outermost surface, wherein the surface layer contains a precious metal element made of at least one kind selected from the group consisting of Ag, Au, and a platinum group element, and In.

Here, the foundation material may include an intermediate layer formed on a base material, and the intermediate layer may contain at least one kind selected from the group consisting of Cr, Mn, Fe, Co, Ni, and Cu.

Furthermore, at least part of In contained in the surface layer may be an alloy with the precious metal element. The surface layer may include a precious metal portion containing the precious metal element as a main constituent, and a high-concentration In portion containing higher-concentration In than the precious metal portion, and the precious metal portion and the high-concentration In portion may be both exposed on the outermost surface.

The precious metal element may contain at least either Ag or Au. Moreover, the precious metal element may contain Ag, and the surface layer may contain at least one kind of intermetallic compound selected from the group consisting of $Ag_3In$, $Ag_9In_4$, and $AgIn_2$.

A connection terminal according to the present disclosure is made of the metallic material as described above, and the surface layer is formed on a surface of the foundation material, at least in a contact portion electrically contacting an opposite electrically conductive member.

In the metallic material according to the disclosure described above, the surface layer contains a precious metal element made of at least one kind selected from the group consisting of Ag, Au, and a platinum group element, and In. The precious metal element has high electric conductivity, and thereby keeps down the contact resistance of the surface layer. On the other hand, since In is a soft metal and exhibits a solid lubricating action, the friction coefficient of the surface of the metallic material can be kept down. Moreover, in can easily break a formed oxide film by the application of a load or the like even when subjected to oxidizing. In this way, the surface layer exposed on the outermost surface of the metallic material contains In together with the precious metal element, and thereby, the friction coefficient of the whole surface layer is easily kept down, without damaging the low contact resistance characteristic by the precious metal element in the whole surface layer.

Here, the foundation material has an intermediate layer formed on a base material, and the intermediate layer contains at least one kind selected from the group consisting of Cr, Mn, Fe, Co, Ni, and Cu. In this case, mutual diffusion of constituent elements can be suppressed between the base material and the surface layer by the presence of the intermediate layer. Therefore, when the metallic material is heated, the constituent elements of the base material do not easily diffuse on the surface layer and then affect the composition and characteristics of the surface layer.

Furthermore, in the case where at least part of In contained in the surface layer is an alloy with a precious metal element, a structure in which In is distributed in the surface layer together with the precious metal element is stably formed with ease. The alloy of the precious metal element and In exhibits a high effect in reducing the friction coefficient of the surface layer owing to the contribution of In, and contributes to the suppression of the raise of contact resistance owing to easily breakable properties of the oxide film.

The surface layer includes a precious metal portion containing the precious metal element as a main constituent, and a high-concentration In portion containing higher-concentration In than the precious metal portion, and the precious metal portion and the high-concentration In portion are both exposed on the outermost surface. In this case, characteristics such as heat resistance and low contact resistance of the precious metal element are exerted by the precious metal portion, and an effect such as friction coefficient reduction obtained by the addition of In is exerted by the high-concentration In portion. Thus, the whole surface layer easily achieves both low contact resistance and a low friction coefficient at a high degree.

When the precious metal element contains at least either Ag or Au, particularly low contact resistance can be obtained in the surface layer because Ag or Au has particularly high electric conductivity among precious metal elements and is less subject to oxidizing. On the other hand, Ag or Au exhibits high adhesive properties, and tends to be high in the friction coefficient of the surface when used alone, but the friction coefficient of the surface layer can be kept down by containing In in the surface layer.

Furthermore, the precious metal element contains Ag, and the surface layer contains at least one kind of intermetallic compound selected from the group consisting of $Ag_3In$, $Ag_9In_4$, and $AgIn_2$. In this case, a surface layer having low contact resistance and a low friction coefficient is stably formed and easily maintained by containing Ag and In.

In a connection terminal according to the disclosure described above, the surface layer as described above is formed at least in a contact portion. Therefore, in the contact portion, both a low friction coefficient and low contact resistance can be achieved.

BRIEF DESCRIPTION OF THE DRAWINGS

FIG. 1A illustrates the configuration of the whole section, and FIG. 1B illustrates an example of the state of a surface layer in an enlarged form.

FIG. 3(a) illustrates a case where a precious metal element is Ag. FIG. 3(b) illustrates a case where a precious metal element is Au.

DETAILED DESCRIPTION OF EMBODIMENTS

Hereinafter, an embodiment of the present disclosure is described in detail by use of the drawings. In the present specification, it is assumed that, unless otherwise stated, the content (concentration) of each element is indicated with an atomic ratio such as atomic percentage as a unit. Further, it is assumed that a simple metal and a metal made of only a precious metal element also includes a case of containing an irreversible impurity. Unless otherwise stated, it is assumed that an alloy includes both a case of being a solid solution and a case of constituting an intermetallic compound.

[Metallic Material]

A metallic material according to one embodiment of the present disclosure is made of a stack of metallic substances. The metallic material according to one embodiment of the present disclosure may constitute any metallic member, but can be suitably utilized as a material constituting an electric connection member such as a connection terminal.

(Configuration of Metallic Material)

Figure 1A:
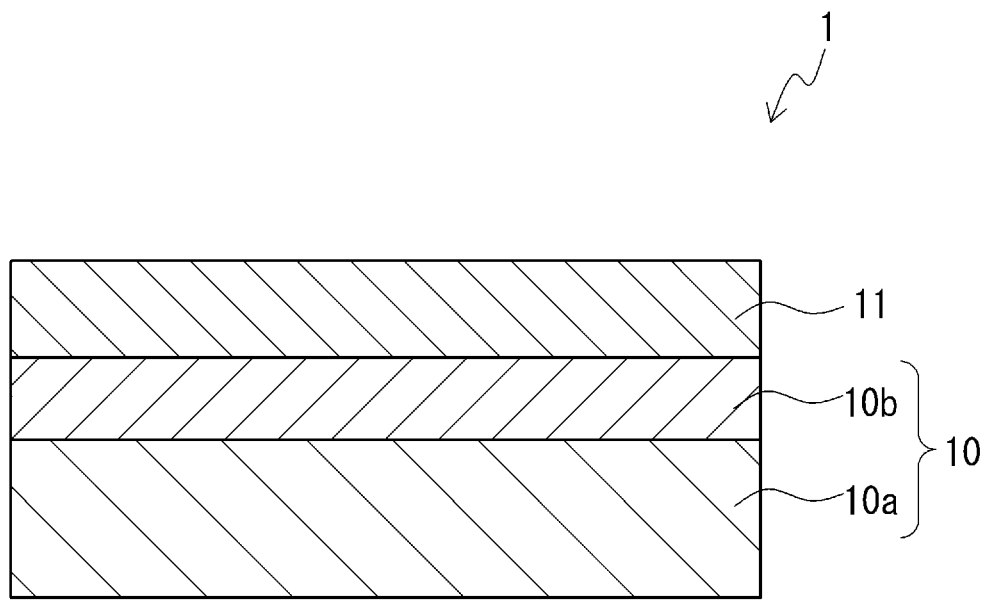
FIGS. 1A and 1B are a sectional view schematically illustrating a stack structure in a metallic material according to one embodiment of the present disclosure.

FIG. 1(a) illustrates a stack structure of a metallic material 1 according to one embodiment of the present disclosure. The metallic material 1 includes a foundation material 10, and a surface layer 11 formed on a surface of the foundation material 10 and exposed on an outermost surface. As will be described later, the surface layer 11 contains a precious metal element and In. A thin film (not illustrated) such as an organic layer may be provided on the surface layer 11 exposed on the outermost surface of the metallic material 1, to the extent that characteristics of the surface layer 11 are not damaged. However, other kinds of metallic layers are not provided on the surface of the surface layer 11.

The foundation material 10 may be configured by a single metallic material, but is preferably made of a base material 10a and an intermediate layer 10b. The intermediate layer 10b is made of a thin metallic layer thinner than the base material 10a, and formed on the surface of the base material 10a.

The base material 10a can be configured by a metallic material having any shape such as a plate shape. While a substance constituting the base material 10a is not particularly limited, Cu or a Cu alloy, Al or a Al alloy, Fe or an Fe alloy, or the like can be suitably used as a substance constituting the base material 10a, when the metallic material 1 constitutes an electric connection member such as a connection terminal. Among others, Cu or a Cu alloy having high electric conductivity can be suitably used.

By providing the intermediate layer 10b in contact with the surface of the base material 10a, it is possible to obtain the effect of improving close contact between the base material 10a and the surface layer 11, the effect of suppressing mutual diffusion of constituent elements between the base material 10a and the surface layer 11, and others. As a substance constituting the intermediate layer 10b, it is possible to exemplify a metallic substance containing a Period 4 transition metal element, i.e., a Period 4 element made of at least one kind selected from the group consisting of Cr, Mn, Fe, Co, Ni, and Cu. The substance constituting the intermediate layer 10b may be a simple metal made of one kind selected from the Period 4 elements described above, or may be an alloy containing one kind or two or more kinds of metallic elements selected from the Period 4 elements described above. When made of an alloy, the substance may contain other metallic elements in addition to the Period 4 elements described above, but preferably contains the Period 4 element described above as a main constituent. Additionally, the intermediate layer 10b may include only one layer, or may include a stack of two or more kinds of layers. When the foundation material 10 is made of a single metallic material without including the intermediate layer 10b as well, at least the surface of the single metallic material has only to be made of a metal containing the Period 4 element described above.

Particularly, when the base material 10a is made of Cu or a Cu alloy, the intermediate layer 10b is constituted by a metal including, as a main constituent, a metal containing the Period 4 element described above, particularly, a metal containing the Period 4 element described above. Thereby, even in a condition where temperature becomes high, it is possible to effectively suppress diffusion of Cu from the base material 10a to the surface layer 11, and an influence on the constituent composition and characteristics of the surface layer 11, such as consumption of In resulting from the formation of an alloy with diffused Cu. Among others, when the intermediate layer 10b is constituted by Ni or an alloy containing Ni as a main constituent, suppression of diffusion of Cu to the surface layer 11 can be effectively achieved.

The thickness of the intermediate layer 10b is not particularly limited, but is preferably 0.1 μm or more, from the viewpoint of effectively achieving suppression of diffusion between the base material 10a and the surface layer 11, and others. On the other hand, from the viewpoint of avoiding the formation of an excessively thick intermediate layer 10b, the thickness of the intermediate layer 10b is preferably 3.0 μm or less. In the intermediate layer 10b, part of the base material 10a side may form an alloy with the constituent element of the base material 10a, and part of the surface layer 11 side may form an alloy with the constituent element of the surface layer 11.

The surface layer 11 is constituted as a metallic layer containing a precious metal element and In. Here, a precious metal element is made of at least one kind selected from the group consisting of Ag, Au, and a platinum group element, i.e., Ag, Au, Ru, Rh, Pd, Os, Ir, and Pt.

Although the surface layer 11 may contain a precious metal element and an element other than In, but is preferably a layer containing a precious metal element and In as main constituents, i.e., a layer in which the sum of a precious metal element and In accounts for 50 atomic percent or more, in order not to damage characteristics given by the precious metal element and In, as described below. Particularly, the surface layer 11 is preferably in a form made of a precious metal element and In alone, except for containing of an irreversible impurity, and degeneration such as oxidizing, carbonizing, nitriding, or the like in the vicinity of a surface. One kind of precious metal element may be contained, or two or more kinds of precious metal elements may be contained.

As long as both precious metal atoms and In atoms exist in the outermost surface in the surface layer 11, a precious metal element and In may be distributed in the surface layer 11 in any manner. Moreover, a precious metal element and In may each be in a state of a simple metal, or may form an alloy. A part having a simple metal and a part having an alloy may coexist.

In is a metal which forms an alloy with a precious metal element. From the viewpoint of stably maintaining the state of the surface layer 11, it is preferable that at least part of In contained in the surface layer 11 constitutes an alloy with a precious metal element (an NM-In alloy). An NM-In alloy may be a solid solution or an intermetallic compound.

Figure 1B:
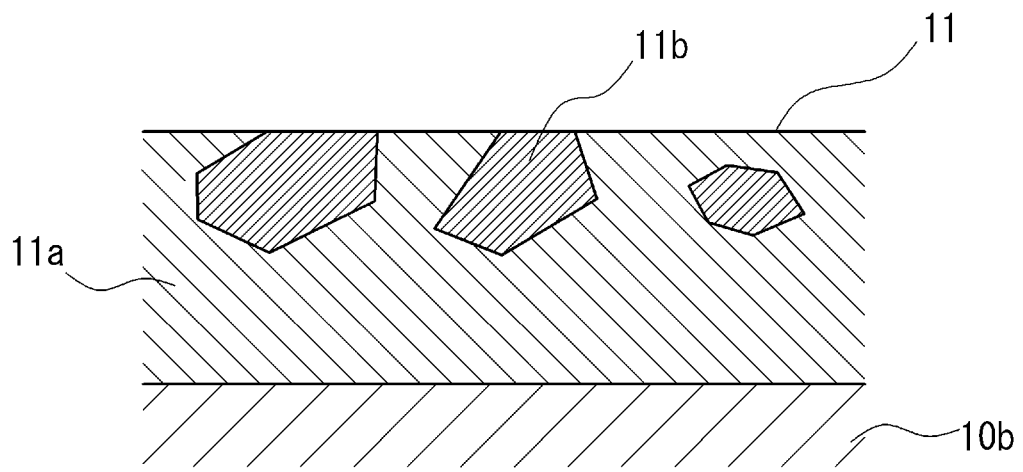

The surface layer 11 may be made of an NM-In alloy that is homogeneous as a whole. However, from the viewpoint of significantly exerting each of the characteristics given by a precious metal element and In in the surface layer 11, the surface layer 11 preferably include, in a coexistent manner, two kinds of phases of a precious metal portion IIa relatively high in the concentration of a precious metal element, and an high-concentration In portion 11b relatively high in the concentration of In, for example, as illustrated in FIG. 1(b).

Here, the precious metal portion 11a is a phase containing a precious metal as a main constituent, and it is possible to exemplify a form made of a precious metal element alone, or a form made of an NM-In alloy containing a smaller amount of In than the precious metal element. From the viewpoint of sufficiently exerting characteristics of the precious metal element, the precious metal portion 11a is preferably made of a precious metal element alone.

The high-concentration In portion 11b contains a higher concentration of In than the precious metal portion 11a. Specifically, it is possible to exemplify a form made of simple In (a form made of In and an irreversible impurity), or a form made of an NM-In alloy having a higher concentration of In (the atomic ratio of In to the precious metal element) than the precious metal portion 11a.

The precious metal portion 11a and the high-concentration In portion 11b may be both made of an NM-In alloy, in which case the high-concentration In portion 11b has an alloy composition having a higher atomic ratio of In to the precious metal element than the precious metal portion 11a. For example, when the surface layer 11 contains intermetallic compounds of two kinds of compositions $NM_aIn_b$ and $NM_cIn_d$ (b/a<d/c) each using a precious metal element as NM, a part made of $NM_aIn_b$ can be regarded as the precious metal portion 11a, and a part made of $NM_cIn_d$ can be regarded as the high-concentration In portion 11b. Moreover, the precious metal portion 11a and the high-concentration In portion 11b may each contain two or more kinds of parts different in composition, and include, for example, a form containing both a simple metal and an alloy, and a form containing two or more kinds of alloys different in constituent composition.

When the surface layer 11 includes the precious metal portion 11a and the high-concentration In portion 11b, the precious metal portion 11a and the high-concentration In portion 11b may be distributed in any manner as long as both precious metal atoms and In atoms exist on the outermost surface. By way of example, it is possible to produce a structure in which the precious metal portion 11a in a layer shape is formed on a surface of the foundation material 10, and the high-concentration In portion 11b made of an NM-In alloy is provided on a surface of the precious metal portion 11a.

However, in the surface layer 11, from the viewpoint of effectively utilizing each of the characteristics of the precious metal portion 11a and the high-concentration In portion 11b as the characteristic of the whole surface layer 11, the precious metal portion 11a and the high-concentration In portion 11b are preferably mixed in the surface layer 11 without separating into layer shapes, as illustrated in FIG. 1(b). In this case, the high-concentration In portion 11b may be in a form of being mixed so as to be distributed into the precious metal portion 11a. Moreover, from the viewpoint of effectively utilizing each of the characteristics of the precious metal portion 11a and the high-concentration In portion 11b as the characteristic on the surface of the metallic material 1, it is preferable that the precious metal portion 11a and the high-concentration In portion 11b are both exposed on the outermost surface.

It is preferable that if the precious metal portion 11a and the high-concentration In portion 11b are mixedly distributed in the whole region in the depth direction of the surface layer 11, the characteristics of each portion can be stably exerted. However, both the precious metal portion 11a and the high-concentration In portion 11b have only to be mixedly distributed at least on the outermost surface of the surface layer 11 and in its vicinity (a surface portion). In this case, as long as the high-concentration In portion 11b coexists with the precious metal portion 11a in the surface portion, the ratio of the high-concentration In portion 11b may be lower in the inner portion of the surface layer 11 than in the surface portion, or the precious metal portion 11a alone may occupy the inner portion of the surface layer 11.

The ratio of the contents of In and a precious metal element in the surface layer 11 has only to be suitably set according to desired characteristics of the surface layer 11. However, as will be described later in detail, from the viewpoint of effectively exerting characteristics given by In such as reduction of the friction coefficient of the surface, the content of In is preferably 5% or more in atomic ratio to a precious metal element (In [at %]/NM [at %]) in the whole surface layer 11 (in the sum of the precious metal portion 11a and the high-concentration In portion 11b).

On the other hand, the content of In in the whole surface layer 11 is lower than a precious metal element, from the viewpoint of effectively exerting characteristics given by the a precious metal element such as reduction of the contact resistance of the surface. Moreover, the content of In in the whole surface layer 11 is preferably 25% or less in atomic ratio to a precious metal element. By keeping the content of In at these values or less, the precious metal portion 11a is easily formed with the constituent composition having a high concentration of a precious metal element including a form of being made of a precious metal element alone.

Containing In that is 5% or more and 25% or less in atomic ratio to a precious metal element in the whole region in the depth direction of the surface layer 11a s described above is preferable from the viewpoint of acquiring and maintaining a stable structure and characteristics in the whole surface layer 11. However, it is preferable that In that is 5% or more and 25% or less in atomic ratio to a precious metal is contained at least in the outermost surface. Further, it is preferable that such a concentration of In is contained in a region up to a depth of approximately 50 nm from the outermost surface.

The thickness of the whole surface layer 11 is not particularly limited, and has only to enable sufficient exertion of the characteristics given by a precious metal element and In. For example, the thickness of the whole surface layer 11 is preferably 0.05 µm or more. On the other hand, the thickness may be 0.5 µm or less from the viewpoint of avoiding the formation of an excessively thick surface layer 11.

As described above, a precious metal element contained in the surface layer 11 is not particularly limited as long as the precious metal element is at least one kind selected from the group consisting of Ag, Au, and various platinum group elements. However, among these elements, a precious metal element selected from the group consisting of Ag, Au, Rh, Pd, Ir, and Pt is preferably used in that such a precious metal element can form a stable surface layer 11, is less subject to oxidizing, and easily maintains low contact resistance of the surface layer 11. Among others, a precious metal element preferably contains at least either Ag or Au in that such a precious metal element is particularly less subject to oxidizing and has a particularly high effect in reducing contact resistance. Further, a precious metal element is preferably made of at least either Ag or Au alone. Ag in particular is a material that costs lower than Au, exhibits particularly high adhesive properties as will be described later, and significantly shows effects by the addition of In. Therefore, a precious metal element preferably contains at least Ag.

Ag and Au are metals which easily form an alloy with In even at room temperature, and In easily forms an Ag—In alloy or an Au—In alloy, in such a case that the surface layer 11 is formed by stacking Ag layers or Au layers and In layers, as will be described later. When a precious metal element contains Ag, the composition of an Ag—In intermetallic compound that can be formed in the surface layer 11 includes $Ag_3In$, $Ag_9In_4$, and $AgIn_2$. An Ag—In alloy contained in the surface layer 11 may contain one kind or two or more kinds selected from these three kinds of metallic elements. For example, as shown in the subsequent examples, a total amount detected as a phase containing In by an X-ray diffraction method (XRD) is preferably these intermetallic compounds, except for an irreversible impurity. Moreover, from the viewpoint of forming a surface layer 11 that sufficiently exhibits characteristics exerted by In, the surface layer 11 preferably includes at least either $Ag_9In_4$ or $AgIn_2$ that is relatively high in the atomic ratio of In to Ag among the three kinds described above.

On the other hand, when a precious metal element contains Au, an Au—In alloy tends to take a state of a solid solution in the surface layer 11. Particularly, when the content of In is low, an Au—In alloy tends to be a solid solution in which In is dissolved in the lattice of Au. If the content of In increases, an intermetallic compound comes to be formed. The composition of an Au—In intermetallic compound that can be formed in the surface layer 11 includes $AuIn_2$, $AuIn$, $Au_7In_3$, $Au_3In$, $Au_4In$, and $Au_8In$.

Furthermore, when a precious metal element is made of Ag, the precious metal portion (Ag portion) 11a is preferably made of soft silver. Soft silver has a hardness of approximately 80 Hv or less, and has a lowered content of impurity elements such as Sb having the action of raising hardness. In the precious metal portion 11a, and in the whole surface layer 11, the concentration (excluding In) of impurity elements including Sb is preferably 1.0 atomic percent or less, and further, 0.1 atomic percent or less.

(Surface Characteristics of Metallic Material)

In the metallic material 1 according to the present embodiment, the surface layer 11 includes both a precious metal and In as described above, and both a precious metal element and In exist in the outermost surface of the surface layer 11. Thus, both the characteristics given by the precious metal element and the characteristics given by In can be utilized as the characteristics of the surface of the metallic material 1.

Specifically, high electric conductivity given by the precious metal element can be utilized by containing the precious metal element in the surface layer 11. Thus, the surface of the surface layer 11 can be in a state of high contact resistance. Moreover, even if the surface layer 11 is heated, a state of high electric conductivity is easily maintained, and low contact resistance is easily kept. Among precious metal elements, Ag, Au, Rh, Pd, Ir, and Pt are less subject to oxidizing, and therefore have a particularly high effect in keeping low contact resistance. Among others, Ag and Au are high in both electric conductivity and difficulty of oxidizing, and have an extremely high effect in keeping low contact resistance.

On the other hand, in is a relatively soft metal, and exhibits high solid lubricating properties. Moreover, an oxide film formed on the surface is also relatively soft, and can be easily broken by the application of a load or the like. The solid lubricating properties of In and the easily breakable properties of the oxide film are exerted even in the form of an NM-In alloy. Thus, when In is contained in the surface layer 11, the effect of friction coefficient reduction can be obtained by a solid lubricating action on the surface of the surface layer 11, and a considerable rise in contact resistance resulting from oxidizing becomes easily avoidable. In this way, in is contained in the surface layer 11 together with a precious metal element, and exposed on an outermost surface of the metallic material 1. Thereby, the metallic material 1 has both a low friction coefficient and low contact resistance.

Among precious metal elements, Ag and Au, particularly, Ag exhibits high adhesive properties, and therefore has a possibility of raising the friction coefficient of the surface layer 11 by being exposed on the outermost surface of the surface layer 11. However, by containing In in the surface layer 11 together with the precious metal elements, the friction coefficient of the whole surface layer 11 can be kept down owing to the effect of friction coefficient reduction exhibited by In. In this way, the effect of friction coefficient reduction by the addition of In is particularly significant when a precious metal element is Ag or Au than when a precious metal element is a platinum group element.

As described above, in the surface layer 11, precious metal atoms and In atoms may be distributed in any manner as long as both precious metal atoms and In atoms exist on the outermost surface. However, when the precious metal portion 11a and the high-concentration In portion 11b are mixed and are both exposed on the outermost surface in the surface layer 11, surface characteristics by the precious metal element such as low contact resistance are easily exerted strongly in the precious metal portion 11a, and at the same time, surface characteristics by In such as a low friction coefficient are easily exerted strongly in the high-concentration In portion 11b. Thus, by mixing the precious metal portion 11a and the high-concentration In portion 11b, both low contact resistance and a low friction coefficient can be effectively achieved in the whole surface layer 11.

As described above, it is preferable that In can form an alloy with a precious metal element, and at least part of In contained in the surface layer 11 as the high-concentration In portion 11b or the like forms an NM-In alloy. Thereby, it becomes easy to stably maintain a state of the surface layer 11, such as a state where the precious metal portion 11a and the high-concentration In portion 11b coexist.

Furthermore, in the surface layer 11, when an NM-In alloy is formed, an alloy composition is not particularly limited. However, if the surface layer 11 contains an intermetallic compound having a high atomic ratio of In to a precious metal element as in $Ag_9In_4$ or $AgIn_2$ when a precious metal element is Ag, the effect of friction coefficient reduction by In is effectively developed with ease as the characteristics of the surface layer 11. The composition of an NM-In alloy can be controlled by the ratio of the amounts of a precious metal element and In used as the raw materials that form the surface layer 11, a formation condition of the surface layer 11, and others.

In the surface layer 11, if the content of In is 5% or more in atomic ratio to a precious metal element at least on the outermost surface and in its vicinity, a friction coefficient reduction characteristic by In can be more effectively obtained. On the other hand, even when oxidized, the surface of In or an NM-In alloy easily maintains a state of low contact resistance owing to the easily breakable properties of the oxide film as described above. However, when the surface layer 11 is made of a precious metal element alone, contact resistance tends to be high. Thus, if the content of In in the surface layer 11 is kept lower than a precious metal element, and further, set to 25% or less in atomic ratio to a precious metal element, the effect of contact resistance reduction by the precious metal element can be effectively utilized as characteristic of the whole surface layer 11.

The metallic material 1 according to the present embodiment has low contact resistance and exhibits a low friction coefficient on the surface, as described above. Thus, the metallic material 1 can be suitably utilized for the purpose of an electric component, particularly, an electric connection member, such as a connection terminal, contacting an opposite electrically conductive member on the surface of the surface layer 11.

(Manufacturing Method of Metallic Material)

The metallic material 1 according to the present embodiment can be manufactured by forming the surface layer 11 after forming the intermediate layer 10b on the surface of the base material 10 by a plating method or the like as appropriate.

The surface layer 11 may be formed by any method such as a vapor deposition method, a plating method, or a dipping method, but can be suitably formed by a plating method. In this instance, the surface layer 11 containing a precious metal element and In may be formed by eutectoid of the precious metal element and In, but from the viewpoint of convenience, the surface layer 11 can be formed after precious metal layers and In layers are stacked, formed, and then suitably alloyed.

By stacking a precious metal layer and an In layer, then heating the layers as appropriate, and thereby alloying a precious metal element and In, a surface layer 11 containing an NM-In alloy can be formed. When a precious metal element is Ag or Au, alloying with In easily progresses even at room temperature. Therefore, a surface layer 11 containing an NM-In alloy can be formed without performing special heating, after a precious metal layer and an In layer are formed at room temperature. The stacking order of the precious metal layer and the In layer is not particularly limited. However, the surface layer 11 in which the high-concentration In portion 11b is exposed on the outermost surface together with the precious metal portion 11a after alloying is easily formed by forming a precious metal layer on the lower layer, and forming an In layer on the surface of the precious metal layer. The thickness of each of the precious metal and In layers, and the thickness ratio between the layers have only to be suitably selected depending on the desired thickness, constituent composition, and others of the surface layer 11. However, it is possible to exemplify, as a suitable form, a form in which the thickness of the precious metal layer is 0.5 to 10 μm and the thickness of the In layer is 0.05 to 0.5 μm.

[Connection Terminal]

A connection terminal according to one embodiment of the present disclosure is made of the metallic material 1 according to the embodiment described above, and the surface layer 11 containing a precious metal element and In is formed on a surface of the base material 10, at least in a contact portion which electrically contacts an opposite electrically conductive member. A connection terminal is not particularly limited in specific shape and kind.

Figure 2:
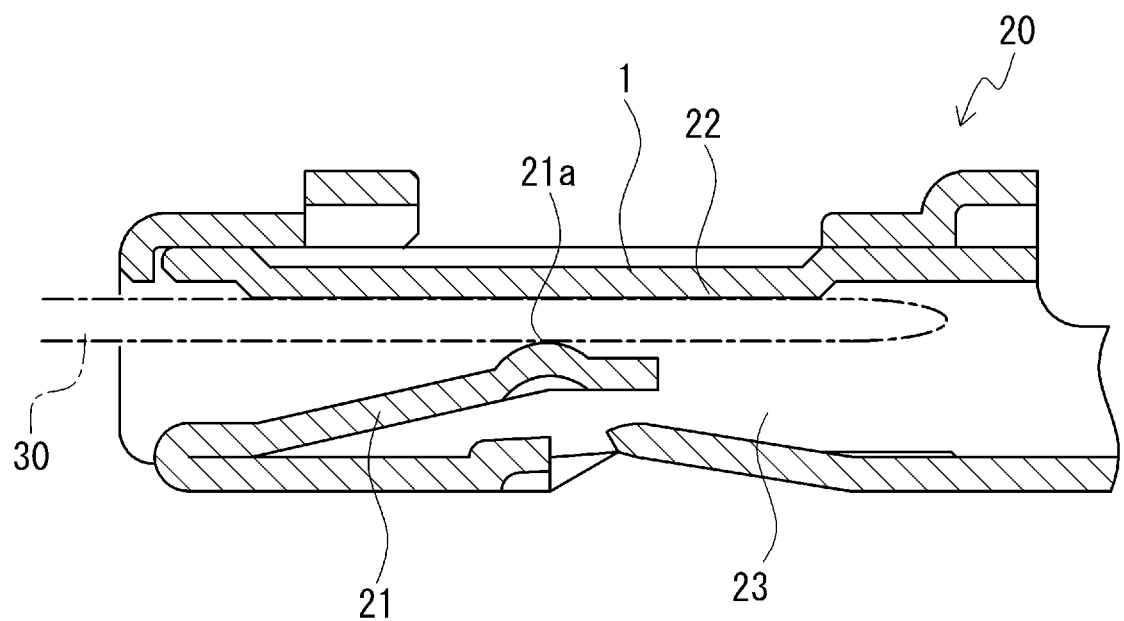
FIG. 2 is a sectional view illustrating an overview of a connection terminal according to one embodiment of the present disclosure.

A female connector terminal 20 is illustrated in FIG. 2 as an example of the connection terminal according to one embodiment of the present disclosure. The female connector terminal 20 has a shape similar to that of a publicly known fit-type female connector terminal. That is, a pressure-clamp portion 23 is formed into an rectangular cylindrical shape which is open in front, and the inner side of the bottom surface of the pressure-clamp portion 23 has an elastic contact piece 21 having an inwardly and backwardly folded shape. When a flat-plate-type tab-shaped male connector terminal 30 is inserted, as an opposite electrically conductive member, into the pressure-clamp portion 23 of the female connector terminal 20, the elastic contact piece 21 of the female connector terminal 20 contacts the male connector terminal 30 in an embossed portion 21a bulging out toward the inner side of the pressure-clamp portion 23, and applies upward force to the male connector terminal 30. The surface of a ceiling portion of the pressure-clamp portion 23 opposed to the elastic contact piece 21 serves as an inner opposed contact surface 22. The male connector terminal 30 is pressed against the inner opposed contact surface 22 by the elastic contact piece 21, and thereby pressure-clamped and held in the pressure-clamp portion 23.

The whole female connector terminal 20 is configured by the metallic material 1 having the surface layer 11 according to the embodiment described above. Here, the surface of the metallic material 1 in which the surface layer 11 is formed is directed to the inner side of the pressure-clamp portion 23, and disposed so as to configure the surfaces of the elastic contact piece 21 and the inner opposed contact surface 22 facing each other. Thereby, when the male connector terminal 30 is inserted into the pressure-clamp portion 23 of the female connector terminal 20 and then slid, both a low friction coefficient and low contact resistance are achieved in the contact portion between the female connector terminal 20 and the male connector terminal 30.

In addition, in the form described here, the whole female connector terminal 20 is configured by the metallic material 1 according to the embodiment described above having the surface layer 11 (and the intermediate layer 10b). However, the surface layer 11 (and the intermediate layer 10b) may be formed in any range as long as the surface layer 11 (and the intermediate layer 10b) is formed at least on the surface of the contact portion contacting an opposite electrically conductive member, i.e., on surfaces of the embossed portion 21a of the elastic contact piece 21 and the inner opposed contact surface 22. While an opposite electrically conductive member such as the male connector terminal 30 may be configured by any material, it is possible to exemplify, as a suitable form, a form in which the male connector terminal 30 is configured by the metallic material 1 according to the embodiment described above having the surface layer 11, or a form in which the male connector terminal 30 is configured by a metallic material in which a metallic layer made of the same precious metal element as that contained in the surface layer 11 is formed on the outermost surface, as in the female connector terminal 20. Moreover, a connection terminal according to an embodiment of the present disclosure can be in various forms such as a press-fit terminal which is press-fit and connected to a through-hole formed in a print-circuit board, in addition to the fit-type female connector terminal or male connector terminal as described above.

EXAMPLES

Hereinafter, the present disclosure is described in detail by use of examples. Hereinafter, unless otherwise stated, a sample is produced and evaluated in the atmosphere and at room temperature.

[Test Method]
(Production of Sample)

Examples 1 to 3 and Comparative Example 1

Raw material layers having predetermined thickness as illustrated in Table 1 were stacked on a surface of a clean Cu substrate. Specifically, first, an Ni intermediate layer having a thickness of 1.0 µm was formed by an electrolytic plating method (except for Example 2). Further, an Ag layer (soft silver) and an In layer were each formed on the surface of the intermediate layer by an electrolytic plating method.

In Examples 1 to 3, the Ag layer and the In layer were stacked one by one in this order. The thickness of the Ag layer was 1.0 µm in each example. The thickness of an In layer was 0.05 µm (Example 1) or 0.20 µm (Examples 2 and 3). An Ag layer alone was formed in a sample of Example 1.

Example 4 and Comparative Example 1

Raw material layers having predetermined thickness as illustrated in Table 3 were formed, by an electrolytic plating method, on a surface of a Cu substrate which was similar to those used in Examples 1 and 2 described above and in which an Ni intermediate layer having a thickness of 1.0 µm was formed. Specifically, in Example 4, an Au layer having a thickness of 0.4 and an In layer having a thickness of 0.05 µm were stacked in this order. An Au layer alone was formed in the sample of Example 2.

(Evaluation of State of Surface Layer)

For the samples of Examples 1 to 3, X-ray diffraction (XRD) measurement by a 2θ method was performed, and the composition and amount of a phase formed on the surface layer were evaluated. In this instance, a quantitative analysis was performed for each phase containing Ag and In on the basis of a reference-intensity-ratio (RIR) method, and the abundance ratio of each phase was estimated. Similarly, for the sample of Example 4 as well, XRD measurement was performed, and the state of a phase containing Au and In was checked.

Furthermore, depth analysis X-ray photoelectron spectroscopy (XPS) measurement using Ar$^+$ sputtering was performed for the samples of Examples 1 to 3, and the distribution of each element in a region from the surface layer up to a depth of 200 nm was checked. For the sample of Example 4, depth analysis Auger electron spectroscopic (AES) measurement using Ar$^+$ sputtering was performed, and the distribution of each element in a region from the surface layer up to a depth of 30 nm was checked.

Moreover, for the samples of Examples 1 to 3, the distributions of constituent elements on the surface of each sample were checked by energy dispersive X-ray spectrometry (EDX) using a scanning electron microscope (SEM). Acceleration voltage was 6 kV. In this instance, detection depth was 50 nm or less. From obtained results, the content of In in a surface layer was evaluated as an atomic ratio to Ag(In [at %]/Ag [at %]).

(Measurement of Friction Coefficient)

The friction coefficient of each sample was measured. For the measurement, an emboss having a radius of 1 mm (R=1 mm) and made of a material in which an Ag-plated layer (soft silver) was formed at a thickness of 1 µm was used with regard to Examples 1 to 3 and Comparative Example 1 using Ag as a precious metal element. An emboss having R=1 mm and made of a material in which an Au-plated layer was formed at a thickness of 1 µm was used with regard to Example 4 and Comparative Example 2 using Au as a precious metal element. The top of the emboss was brought into contact with the surfaces of the plate-shaped samples according to each of the examples and comparative examples. In a state where a contact load of 3 N was applied, each sample was slid 5 mm at a speed of 10 mm/min. During the sliding, kinetic frictional force acting between contacts was measured by use of a load cell. Then, a value obtained by dividing kinetic frictional force by a load was used as a (kinetic) friction coefficient.

(Evaluation of Contact Resistance)

The contact resistance of each sample was measured. In this instance, an Au-plated emboss with R=1 mm was brought into contact with the surface of the plate-shaped sample for each of the examples and comparative examples, and contact resistance was measured while a contact load of 5 N was applied. Measurement was performed by a four-terminal method. Open-circuit voltage was 20 mV, and conduction current was 10 mA.

[Test Results]

(State of Surface Layer)

For Examples 1 to 3 and Comparative Example 1 in which a precious metal element is Ag, the thickness of each raw material layer, the kinds and abundance ratios (mass percent) of formation phases obtained by XRD, and the content of In obtained by EDX are arranged in Table 1. In addition, phases other than those illustrated in Table 1 were not detected as phases containing Ag and/or In by XRD. Further, spatial distributions of In and Ag obtained by EDX showed that a region (Ag portion) having a high Ag concentration and a region (high-concentration In portion) having a high In concentration were mixed, and then exposed on the outermost surface.

As the results of the depth analysis XPS measurement for Examples 1 to 3, it was detected that Ag and In were both distributed on the outermost surface, and the ratio of In to Ag gradually decreased from the outermost surface toward the inner side. Moreover, it was ascertained that impurity metal elements other than In and Ag were not distributed at a concentration equal to or more than a detection limit (0.1 to 1.0 atomic percent).

TABLE 1

| | Raw material layer (μm) | | | Formation phase | In content (Ag ratio; %) |
|---|---|---|---|---|---|
| | Ag layer | In layer | Ni layer | | |
| Example 1 | 1.0 | 0.05 | 1.0 | Ag (52%), $Ag_9In_4$ (48%) | 6.7 |
| Example 2 | 1.0 | 0.20 | 1.0 | $Ag_9In_4$ (15%), $AgIn_2$ (85%) | 33.3 |
| Example 3 | 1.0 | 0.20 | — | Ag (2%), $Ag_9In_4$ (98%) | 20.3 |
| Comparative Example 1 | 1.0 | — | 1.0 | Ag | 0 |

From the analysis result of the formation phases in Table 1 and the results of the XPS described above, it is found that, in Examples 1 to 3, a surface layer containing both Ag atoms and In atoms is formed, and Ag atoms and In atoms are both distributed in the outermost surface. All the phases containing In observed by XRD are an Ag—In alloy.

In the order of Examples 1→2→3, a phase of an intermetallic compound in which the atomic ratio of In to Ag is higher as in Ag→$Ag_9In_4$→$AgIn_2$ comes to be formed as a formation phase, and the ratio of this phase is higher. In Examples 1 and 3, the Ag portion made of simple Ag coexists with the high-concentration In portion made of an Ag—In alloy, whereas in Example 2, no Ag portion made of at least simple Ag is formed, and $Ag_9In_4$ which is an Ag—In alloy having a relatively low content of In is formed as a phase that can be regarded as an Ag portion.

According to Table 1, the content of In also increases in the order of Examples 1→3→2. This shows that as the content of In in the surface layer increases, more phases of an intermetallic compound having a higher atomic ratio of In to Ag are formed. In addition, although the thickness of the In layer as the raw material layer is the same in Examples 2 and 3, the content of In is higher in Example 2 in which an Ni intermediate layer is provided, than in Example 3 in which no Ni intermediate layer is provided. This is considered to be attributed to the fact that the consumption of In resulting from the diffusion of Cu and the associated formation of an alloy with Cu can be suppressed by providing an Ni intermediate layer.

As the results of the depth analysis AES measurement for Example 4 in which a precious metal element was Au, it was detected, as in the cases of Examples 1 to 3 described above, that Au and In were both distributed on the outermost surface, and the ratio of In to Au gradually decreased from the outermost surface toward the inner side. Moreover, it was ascertained that impurity metal elements other than In and Au were not distributed at a concentration equal to or more than a detection limit (0.1 to 1.0 atomic percent).

In the XRD measurement in Example 4, no Au—In intermetallic compound was detected, in contrast to the cases of Examples 1 to 3 described above. Instead, it was found that the lattice constant of Au changed from the value of simple Au. This shows that a solid solution in which In is dissolved in the lattice of Au is formed as an Au—In alloy.

(Characteristics of Surface Layer)

Figure 3A:
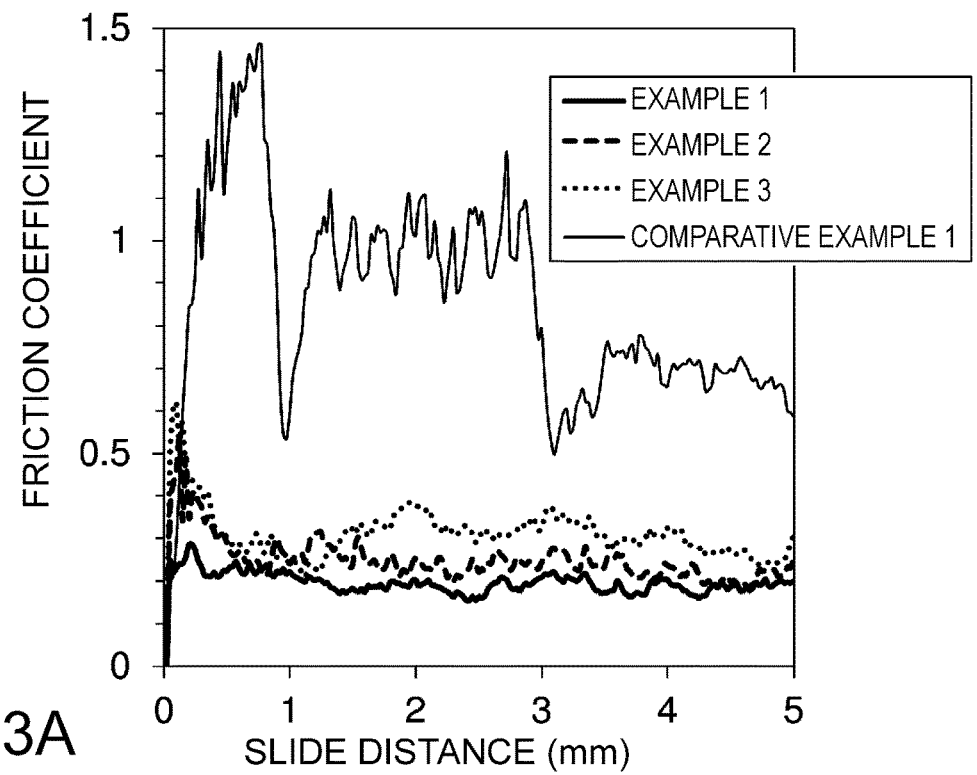
FIGS. 3(a) and 3(b) are diagrams illustrating friction coefficient changes during sliding with regard to each of examples and comparative examples.
Figure 3B:
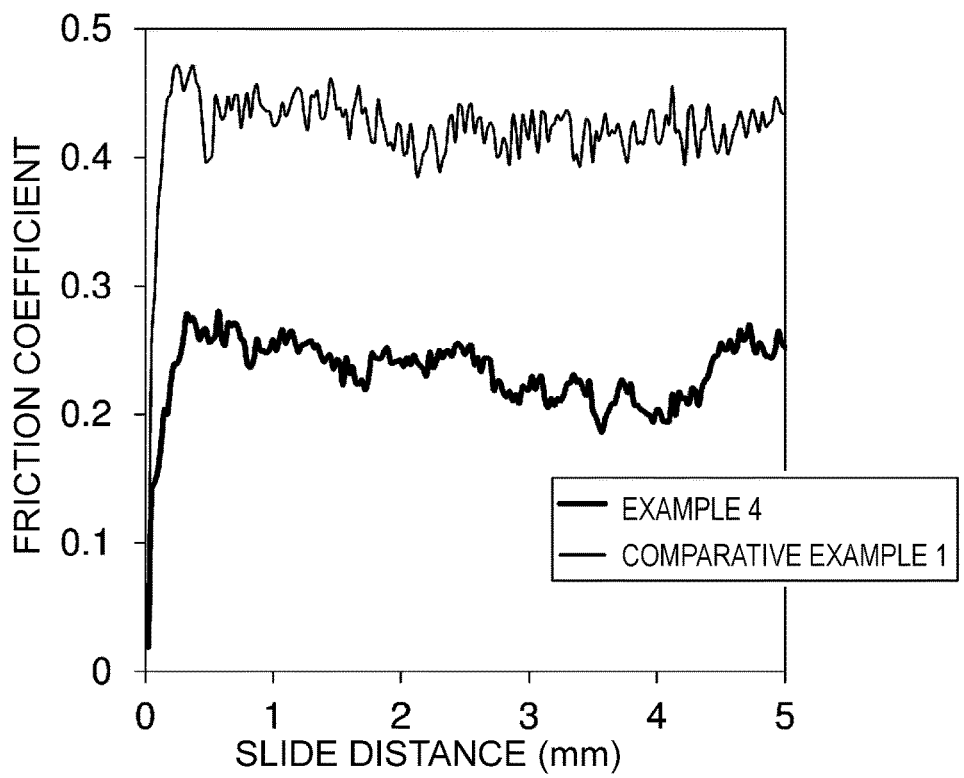

The thickness of each raw material layer, and measurement results of friction coefficients and contact resistance are illustrated in Table 2 for Examples 1 to 3 and Comparative Example 2 in which a precious metal element is Ag, and in Table 3 for Example 4 and Comparative Example 2 in which a precious metal element is Au. Moreover, changes of friction coefficients during sliding are illustrated in each of FIGS. 3(a) and 3(b).

TABLE 2

| | Raw material layer (μm) | | | Friction coefficient | Contact resistance (mΩ) |
|---|---|---|---|---|---|
| | Ag layer | In layer | Ni layer | | |
| Example 1 | 1.0 | 0.05 | 1.0 | 0.2 to 0.3 | 1.4 |
| Example 2 | 1.0 | 0.20 | 1.0 | 0.3 to 0.45 | 1.0 |
| Example 3 | 1.0 | 0.20 | — | 0.2 to 0.6 | 0.8 |
| Comparative Example 1 | 1.0 | — | 1.0 | 0.5 to 1.5 | 0.6 |

TABLE 3

| | Raw material layer (μm) | | | Friction coefficient | Contact resistance (mΩ) |
|---|---|---|---|---|---|
| | Au layer | In layer | Ni layer | | |
| Example 4 | 0.4 | 0.05 | 1.0 | 0.2 to 0.3 | 0.5 |
| Comparative Example 2 | 0.4 | — | 1.0 | 0.4 to 0.5 | 0.6 |

First, when friction coefficients are viewed with regard to the cases where a precious metal element is Ag in Table 2, the friction coefficient is high due to the adhesive properties of Ag in the case of Example 1 in which the surface layer is formed by Ag alone. The variation of values during sliding is also great. In contrast, in each of Examples 1 to 3 in which the surface layer containing Ag and In is formed, a low friction coefficient less than or equal to half of that in Example 1 is obtained. The variation of values caused by sliding is also smaller. That is, in Examples 1 to 3, the rise of the friction coefficient due to the adhesive properties of Ag can be considerably suppressed by the effect of solid lubricating properties exerted by In, even though only a smaller amount of In than Ag is added.

With regard to the case where a precious metal element is Au in Table 3 as well, the friction coefficient is reduced to nearly half in Example 4 in which a surface layer containing Au and In is formed, as compared with the case of Comparative Example 2 in which the surface layer is made of Au. In this way, in the case where Au is used as a precious metal element as well as in the case where Ag is used, the rise of the friction coefficient can be considerably suppressed by the effect of solid lubricating properties exerted by In. Between Ag and Au, Ag adheres more easily. Therefore, the friction coefficient is higher, and the variation of values due to sliding is also greater in Comparative Example 1 in which an Ag layer is provided than in Comparative Example 2 in which an Au layer is provided. However, the friction coefficient is reduced to substantially the same value by the addition of In in the case of Examples 1 to 3 in which Ag is used and in the case of Example 4 in which Au is used.

Next, when measurement results of contact resistance are viewed, extremely low contact resistance is obtained in Comparative Example 1 in which the surface layer is made of Ag alone, reflecting the high electric conductivity of Ag. In contrast, in all the samples of Examples 1 to 3 in which the surface layer containing Ag and In is formed, contact resistance is suppressed to a degree slightly higher than that in the case of Comparative Example 1. This can be interpreted as being attributed to properties of In that easily break an oxide film.

In Comparative Example 2 in which the surface layer is made of Au alone, extremely low contact resistance is obtained, reflecting high electric conductivity of Au. Moreover, in Example 4 in which a surface layer containing Au and In is formed, contact resistance is even lower. When Ag is used as a precious metal, contact resistance slightly rises due to the addition of In. In contrast, when Au is used as a precious metal, contact resistance becomes lower due to the addition of In. This is considered to be attributed to the fact that a solid solution in which In is dissolved in the lattice of Au is formed, and the characteristics of Au are relatively strongly reflected.

From the above, it is obvious that, by forming, on a surface of a metallic material, a surface layer containing In in addition to a precious metal element, the friction coefficient of the surface can be reduced as the effect of In addition, and yet the characteristics of the precious metal element that give low contact resistance are maintained.

While the embodiment of the present disclosure has been described in detail above, the present disclosure is not at all limited to the embodiment described above, and various alterations can be made without departing from the spirit of the present disclosure.

What is claimed is:

1. A metallic material comprising:
   a foundation material; and
   a surface layer formed on a surface of the foundation material and exposed on an outermost surface, wherein
   the surface layer contains a precious metal element made of at least one kind selected from the group consisting of Ag, Au, and a platinum group element, and In,
   the surface layer includes a precious metal portion containing the precious metal element as a main constituent, and a high-concentration In portion containing higher-concentration In than the precious metal portion,
   the precious metal portion and the high-concentration In portion are both exposed on the outermost surface, and
   a ratio of the high-concentration In portion to the precious metal portion is lower in an inner portion of the surface layer than in a surface portion of the surface layer.

2. The metallic material according to claim 1, wherein the foundation material includes an intermediate layer formed on a base material, and
   the intermediate layer contains at least one kind selected from the group consisting of Cr, Mn, Fe, Co, Ni, and Cu.

3. The metallic material according to claim 1, wherein at least part of the In contained in the surface layer is an alloy with the precious metal element.

4. The metallic material according to claim 1, wherein the precious metal element contains at least either Ag or Au.

5. The metallic material according to claim 1, wherein the precious metal element contains Ag, and
   the surface layer contains at least one kind of intermetallic compound selected from the group consisting of $Ag_3In$, $Ag_9In_4$, and $AgIn_2$.

6. A connection terminal being made of the metallic material according to claim 1, wherein the surface layer is formed on a surface of the foundation material, at least in a contact portion electrically contacting an opposite electrically conductive member.

* * * * *